(12) United States Patent
Cardei et al.

(10) Patent No.: US 12,003,894 B1
(45) Date of Patent: Jun. 4, 2024

(54) SYSTEMS, METHODS, AND APPARATUS FOR EVENT DETECTION

(71) Applicant: Waymo LLC, Mountain View, CA (US)

(72) Inventors: Vlad Constantin Cardei, Mountain View, CA (US); Lucian Ion, Mountain View, CA (US)

(73) Assignee: Waymo LLC, Mountain View, CA (US)

(*) Notice: Subject to any disclaimer, the term of this patent is extended or adjusted under 35 U.S.C. 154(b) by 0 days.

(21) Appl. No.: 17/136,940

(22) Filed: Dec. 29, 2020

(51) Int. Cl.
| | |
|---|---|
| *H04N 7/18* | (2006.01) |
| *G06V 20/58* | (2022.01) |
| *H04N 23/54* | (2023.01) |
| *H04N 23/61* | (2023.01) |
| *H04N 23/65* | (2023.01) |
| *H04N 23/695* | (2023.01) |

(52) U.S. Cl.
CPC ............. *H04N 7/188* (2013.01); *G06V 20/58* (2022.01); *H04N 23/54* (2023.01); *H04N 23/61* (2023.01); *H04N 23/651* (2023.01); *H04N 23/695* (2023.01)

(58) Field of Classification Search
CPC ............... H04N 7/188; H04N 5/23299; H04N 5/23218; H04N 5/2253
See application file for complete search history.

(56) References Cited

U.S. PATENT DOCUMENTS

| | | | |
|---|---|---|---|
| 9,676,432 B2 | 6/2017 | Park | |
| 9,848,172 B2 | 12/2017 | DeAngelis et al. | |
| 9,986,170 B2 | 5/2018 | Shin et al. | |
| 10,147,024 B2 | 12/2018 | Wang et al. | |
| 10,341,647 B2 | 7/2019 | Koesters et al. | |
| 10,345,447 B1 | 7/2019 | Hicks | |
| 10,867,396 B1 | 12/2020 | Li | |
| 11,006,048 B2 * | 5/2021 | Yun | .......... H04N 5/23299 |
| 11,048,277 B1 * | 6/2021 | Zhu | .......... G06T 7/20 |
| 11,124,202 B1 * | 9/2021 | Stark | .......... B60W 50/06 |

(Continued)

FOREIGN PATENT DOCUMENTS

| | | |
|---|---|---|
| DE | 102015208442 A1 | 11/2016 |
| KR | 101880998 B1 | 7/2018 |
| WO | 2018111072 A1 | 6/2018 |

OTHER PUBLICATIONS

M. Litzenberger et al., "Embedded Vision System For Real-Time Object Tracking Using an Asynchronous Transient Vision Sensor", 2006, IEEE 12th Digital Signal Processing Workshop & 4th IEEE Signal Processing Education Workshop, Oct. 2006.

(Continued)

*Primary Examiner* — Jonathan R Messmore

(74) *Attorney, Agent, or Firm* — McDonnell Boehnen Hulbert & Berghoff LLP

(57) ABSTRACT

Systems, apparatus, and methods are presented for event detection. One method may include receiving event data from an event capture device while the event capture device is in a stationary state. The event capture device may be coupled to a vehicle. The method may also include generating a command and sending the command to the event capture device. The command is configured to cause the event capture device to change from the stationary state to a non-stationary state.

20 Claims, 6 Drawing Sheets

(56) References Cited

U.S. PATENT DOCUMENTS

| | | | |
|---|---|---|---|
| 2007/0284944 A1* | 12/2007 | Gandert | B60W 10/18 |
| | | | 307/10.6 |
| 2014/0125994 A1 | 5/2014 | Kim et al. | |
| 2014/0347475 A1* | 11/2014 | Divakaran | G06V 20/52 |
| | | | 348/135 |
| 2016/0212410 A1* | 7/2016 | Campbell | H04N 5/23212 |
| 2016/0306824 A1* | 10/2016 | Lopez | G06T 11/60 |
| 2017/0353707 A1* | 12/2017 | Wang | H04N 5/378 |
| 2018/0342081 A1 | 11/2018 | Kim et al. | |
| 2019/0096069 A1 | 3/2019 | Qian et al. | |
| 2019/0172225 A1 | 6/2019 | Park et al. | |
| 2020/0249017 A1* | 8/2020 | Török | G06V 20/10 |
| 2020/0267323 A1 | 8/2020 | Zhou et al. | |
| 2020/0307455 A1* | 10/2020 | Liu | B60R 1/0602 |
| 2020/0361634 A1* | 11/2020 | Gil | G06T 7/001 |
| 2020/0364521 A1* | 11/2020 | Bradski | G06K 7/1447 |
| 2020/0389582 A1 | 12/2020 | Herman | |
| 2021/0116942 A1* | 4/2021 | Gandiga | B64C 39/024 |
| 2021/0316669 A1* | 10/2021 | Wang | G01S 7/4086 |
| 2022/0394196 A1* | 12/2022 | Bock | H04N 25/77 |

OTHER PUBLICATIONS

Everding et al., "Low-Latency Line Tracking Using Event-Based Dynamic Vision Sensors", Frontiers in Neurorobotics, vol. 12, Article 4, Feb. 19, 2018.

Martinez-Conde et al., "The role of fixational eye movements in visual perception", Nature Reviews Neuroscience, 5(3), pp. 229-240, Mar. 2004.

David F. Coppedge, "Why Your Eyes Jitter", Jun. 18, 2007, https://crev.info/2007/06/why_your_eyes_jitter/.

\* cited by examiner

SYSTEMS, METHODS, AND APPARATUS FOR EVENT DETECTION

BACKGROUND

Autonomous vehicles may use various computing systems to aid in the transport of passengers from one location to another. Some autonomous vehicles may operate based on some initial input or continuous input from an operator, such as a pilot, driver, or passenger. Other systems, such as autopilot systems, may be used only when the system has been engaged, which permits the operator to switch from a manual mode (where the operator may exercise a high degree of control over the movement of the vehicle) to an autonomous mode (where the vehicle essentially drives itself) to modes that lie somewhere in between.

Such vehicles are typically equipped with various types of sensors in order to detect objects in the surrounding environment. For example, an autonomous vehicle may include light detection and ranging (lidar) sensors, radio detection and ranging (radar) sensors, sound navigation and ranging (sonar) sensors, image capture devices (e.g., cameras), and other sensor devices which detect and/or capture sensor data from the surroundings of the vehicle. The sensor data from one or more of these sensors may be used to detect objects and their respective characteristics (position, shape, heading, speed, etc.) in a scene. For example, image data from cameras may be used to determine movement of objects in the scene.

Conventional cameras typically include a frame-based image sensor that captures a sequence of still images or frames at a certain frame rate. The frame-based image sensor may output signals from all sensing elements (e.g., pixels) based on an amount of light collected over an exposure period. Thus, such cameras may produce a significant amount of redundant and unnecessary image data because many sensing elements may not change between frame captures. As a result, a large amount of image data may be unnecessarily generated for the sensor elements that remain unchanged. Further, storing and processing redundant information may waste storage space, processing time, and battery power.

Event-based devices having dynamic vision sensors (DVS) may address some of the inefficiencies associated with frame-based image sensors by asynchronously outputting event data only from sensing elements or pixels detecting changes of light intensity. Thus, the sensing elements (e.g., pixels) of the event-based devices that do not detect light intensity changes may not generate event data. As a result, depending on the dynamic contents of a scene, the amount of event data generated by the event-based devices may be substantially reduced as compared to frame-based image sensors. However, such event-based devices may only provide event data about objects or backgrounds moving relative to the event-based devices and may not provide event data about objects or backgrounds that are stationary (e.g., motionless) or static relative to the event-based device. The detection and identification of the stationary or static objects and backgrounds in the scene may be useful for the operation of the autonomous vehicle.

SUMMARY

Systems, methods, and apparatus provide techniques for improving the functioning of computing systems of autonomous vehicles by using event capture devices. The event capture devices may be used for detecting, tracking, recognizing, and/or analyzing scenes in the fields of view of the event capture devices. The event capture devices may provide higher temporal resolution and increased efficiency since the event data may be output asynchronously for only the pixels that sense changes of light intensity. The event capture devices can also reduce power, data storage, and computational requirements associated with processing the event data and significantly improve the efficiency of performing operations on the event data. Further, the computing system may be configured to control movement of the event capture devices to increase the detection of objects and backgrounds in the scenes.

In one aspect, the present application describes a method. The method may include receiving event data from an event capture device while the event capture device is in a stationary state. The event capture device may be coupled to a vehicle. The method may also include generating a command and sending the command to the event capture device. The command is configured to cause the event capture device to change from the stationary state to a non-stationary state.

In another aspect, the present application describes an apparatus comprising a memory and at least one processor. The at least one processor may be configured to receive event data from an event capture device while the event capture device is in a stationary state. The event capture device may be coupled to a vehicle. The at least one processor may also be configured to generate a command and send the command to the event capture device. The command is configured to cause the event capture device to change from the stationary state to a non-stationary state.

In still another aspect, a non-transitory computer-readable medium storing instructions is disclosed that, when the instructions are executed by one or more processors, causes the one or more processors to perform operations. The operations may include receiving event data from an event capture device while the event capture device is in a stationary state. The event capture device may be coupled to a vehicle. The operations may also include generating a command and sending the command to the event capture device. The command is configured to cause the event capture device to change from the stationary state to a non-stationary state.

The foregoing summary is illustrative only and is not intended to be in any way limiting. In addition to the illustrative aspects, implementations, and features described above, further aspects, implementations, and features will become apparent by reference to the figures and the following detailed description.

DETAILED DESCRIPTION

Figure 1:
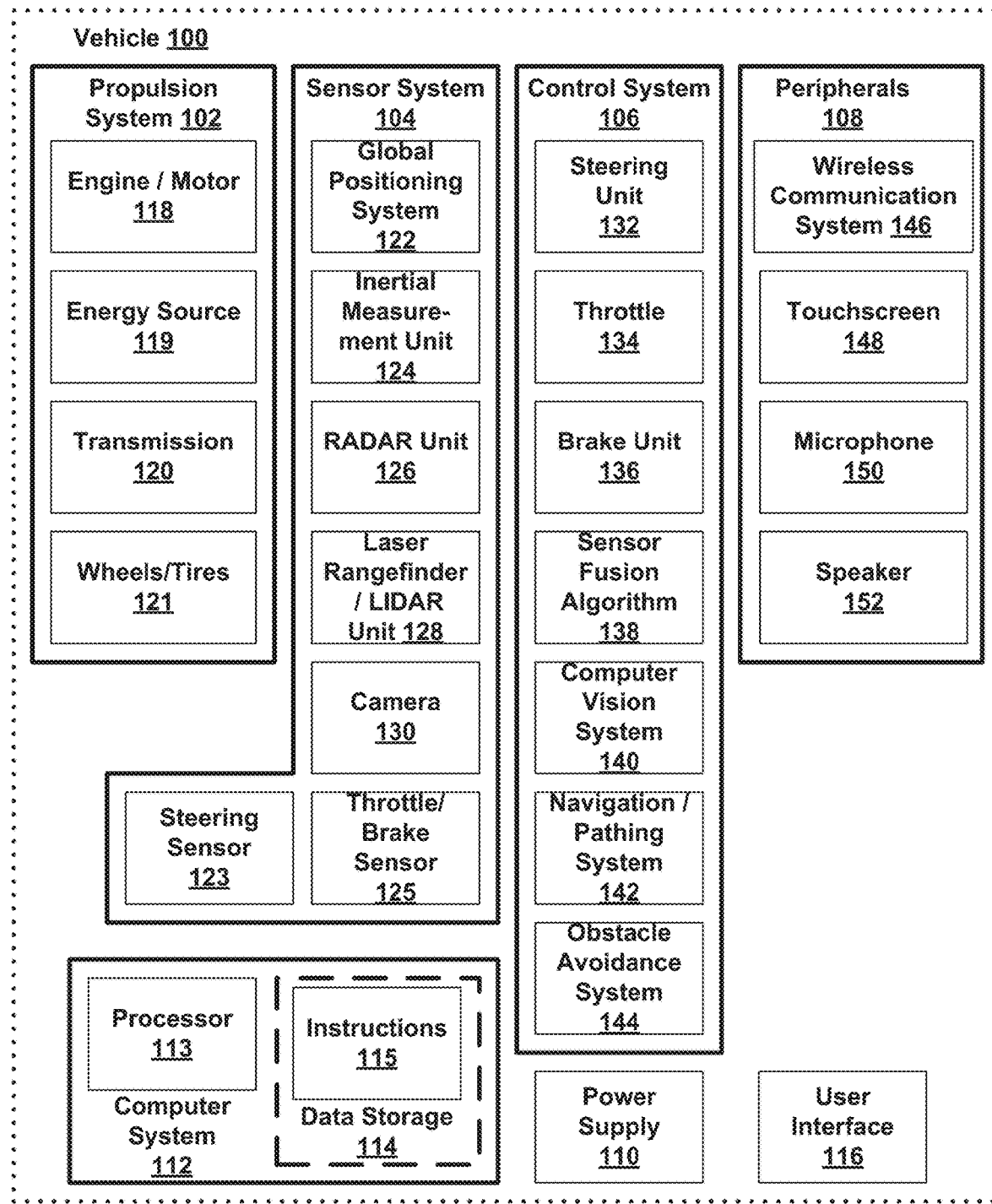
FIG. 1 is a functional block diagram illustrating systems of a vehicle, according to an example implementation.

Example systems, apparatus, and methods are described herein. It should be understood that the words "example," "exemplary," and "illustrative" are used herein to mean "serving as an example, instance, or illustration." Any implementation or feature described herein as being an "example," "exemplary," and/or "illustrative" is not necessarily to be construed as preferred or advantageous over other implementations or features. Thus, other embodiments can be utilized and other changes can be made without departing from the scope of the subject matter presented herein.

Accordingly, the example embodiments and implementations described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment. Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order. Unless otherwise noted, figures are not drawn to scale.

The present disclosure provides systems, apparatus, and methods that improve the functioning of computing systems of autonomous vehicles by using event capture devices. The event capture devices may be used for detecting, tracking, recognizing, and/or analyzing scenes in the fields of view of the event capture devices. The event capture devices may provide higher temporal resolution and increased efficiency since the event data may be output asynchronously for only the pixels that sense changes in light intensity. The event capture devices can also reduce power, data storage, and computational requirements associated with processing event data and significantly improve the efficiency of performing operations on the event data. Further, the computing system may be configured to control movement of the event capture devices to increase the detection of objects and backgrounds in a scene. For example, the event capture devices may transition between a stationary state and a non-stationary (e.g., motion state) to sense objects and backgrounds in a scene that are stationary or static relative to the event capture device. Thus, the computing system may move the event capture camera along a trajectory to trigger or capture events that may be of interest to the operation of the autonomous vehicle.

Autonomous vehicles may navigate a path of travel without requiring a driver to provide guidance and control. In order to obey traffic regulations and avoid obstacles in the environment, the vehicle may utilize sensor data provided by a vehicle sensor system equipped with one or multiple types of sensors. For example, the sensors may include light detection and ranging (lidar) sensors, radio detection and ranging (radar) sensors, sound navigation and ranging (sonar) sensors, image capture devices (e.g., cameras), event capture devices (e.g., event cameras), microphone sensors, and other suitable sensors.

As the vehicle navigates, the sensors of the vehicle sensor system may be configured to capture or acquire sensor information (e.g., measurements) indicative of the vehicle's environment and provide the sensor information periodically or in a continuous manner to a computing device of the vehicle sensor system. For example, the sensor information may include one or multiple measurements of the environment captured at particular times during the operation of the sensors. Further, the sensors may provide the sensor information to the computing device in various formats, which may reflect changes in the environment. The computing system of the vehicle may use the sensor information from the sensors as a basis for operating the vehicle in an autonomous mode.

The sensor system of the vehicle may include an image capture device (e.g., a camera) having a frame-based image sensor configured to capture a sequence of image frames (e.g., images) of the environment in which the vehicle operates. The image capture device may include a plurality of pixels or sensing elements configured in horizontal rows and/or vertical columns. The pixels of the image capture device may be sampled to obtain pixel values or image data for constructing an image or image frame. In some examples, the image capture device may have a rolling shutter configured to iteratively sample or scan the vertical columns and/or horizontal rows of the pixels.

Further, the sensor system of the vehicle may include an event capture device (e.g., an event detector) configured to acquire event data about events occurring in the environment. The event capture device may include a vision sensor configured to detect environmental conditions. In one embodiment, the vision sensor may comprise a dynamic vision sensor (DVS). The DVS may include a plurality of pixels or sensing elements configured in horizontal rows and/or vertical columns. The plurality of pixels may sense illumination changes or events and generate event data (e.g., event signals) based on changes of the light intensity incident on the pixels. A computing system of the vehicle may use the event data from the event capture device and/or the image data from the image capture device to operate the vehicle in an autonomous mode.

The event capture device may include a motion system that may be activated by a computing device of the sensor system in order to control the movement of the event capture device or components thereof, such as the vision sensor. For example, a motor or actuator may cause the event capture device to rotate or move in a horizontal, vertical, and/or angular direction. In some implementations, a motion or force may be applied to the event capture device for a period of time to cause movement of the event capture device. For example, a haptic motion may be introduced by a vibrating mechanism that is in contact with (or integrated with) the event capture device to cause displacement or movement of the event capture device. Further, synchronized or unsynchronized motion may be introduced to induce movement of the event capture device.

The computing device may send a command to the motion system to cause the event capture device to transition between a stationary state (e.g., a still state) and a non-stationary (e.g., a motion state). For example, the event capture device may change from a stationary state to a non-stationary state after a period of time. In some examples, the computing device may cause the event capture device to periodically change between the stationary state and the non-stationary state while the vehicle is stationary or is in motion. As a result, the event capture device may be able to detect objects and backgrounds in the field of view of the event capture device that are stationary or static relative to the event capture device and generate event data about the objects and backgrounds.

The computing device may make a determination that objects and/or backgrounds in the scene may be substantially stationary or static relative to the event capture device. For example, objects located near a center portion of the field of view of the event capture system may be static or stationary relative to the event capture device when the vehicle is traveling in the pointing direction of the event capture device. The computing device may determine or detect objects in the field of view of the event capture device and track the movement of the objects in a scene. The computing device may evaluate the event data received from the event capture device about the objects and may determine that the objects may not be detected as a result of the objects becoming substantially stationary or static relative to the event capture device. For example, the computing device may determine that the event capture device may not sense an object that is substantially static or stationary relative to the event capture device. In some implementations, the computing device may determine that the event data associated with at least a portion of an object is no longer received from the event capture device. In other implementations, the computing device may determine that the sensing elements associated with sensing an object are static or not generating event data. When the event capture device is unable to sense the object, the computing device may use other sensors to determine that the object is in the field of view of the event capture device.

Once the computing device makes a determination that the event capture device may not sense or detect an object or a background in the field of view of the event capture device, the computing device may cause a motor or actuator to move the event capture device. As a result, the event capture device may transition between a stationary state (e.g., a still state) and a non-stationary state (e.g., a motion state). Due to the movement of the event capture device, the event captured device may generate event data associated with objects and backgrounds in the field of view of the event capture device that are stationary or static relative to the event capture device. Thus, the computing system may move the event capture camera along a trajectory to trigger or capture events that may be of interest to the operation of the autonomous vehicle.

Example systems, apparatus, and methods that implement the techniques described herein will now be described in greater detail with reference to the figures. Generally, an example system may be implemented in or may take the form of a sensor or computer system of an automobile. However, a system may also be implemented in or take the form of other systems for vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, trolleys, and robot devices. Other vehicles are possible as well.

Referring now to the figures, FIG. 1 is a functional block diagram illustrating systems of an example vehicle 100, which may be configured to operate fully or partially in an autonomous mode. More specifically, the vehicle 100 may operate in an autonomous mode without human interaction through receiving control instructions from a computing system. As part of operating in the autonomous mode, the vehicle 100 may use one or more sensors to detect and possibly identify objects of the surrounding environment to enable safe navigation. In some implementations, the vehicle 100 may also include subsystems that enable a driver to control operations of the vehicle 100.

As shown in FIG. 1, the vehicle 100 may include various subsystems, such as a propulsion system 102, a sensor system 104, a control system 106, one or more peripherals 108, a power supply 110, a computer or computing system 112, a data storage 114, and a user interface 116. In other examples, the vehicle 100 may include more or fewer subsystems, which can each include multiple elements. The subsystems and components of the vehicle 100 may be interconnected in various ways. In addition, functions of the vehicle 100 described herein can be divided into additional functional or physical components, or combined into fewer functional or physical components within implementations. For instance, the control system 106 and computer system 112 may be combined into a single system that operates the vehicle 100 in accordance with various operations.

The propulsion system 102 may include one or more components operable to provide powered motion for the vehicle 100 and can include an engine/motor 118, an energy source 119, a transmission 120, and wheels/tires 121, among other possible components. For example, the engine/motor 118 may be configured to convert the energy source 119 into mechanical energy and can correspond to one or a combination of an internal combustion engine, an electric motor, steam engine, or Stirling engine, among other possible options. For instance, in some implementations, the propulsion system 102 may include multiple types of engines and/or motors, such as a gasoline engine and an electric motor.

The energy source 119 represents a source of energy that may, in full or in part, power one or more systems of the vehicle 100 (e.g., an engine/motor 118). For instance, the energy source 119 can correspond to gasoline, diesel, other petroleum-based fuels, propane, other compressed gas-based fuels, ethanol, solar panels, batteries, and/or other sources of electrical power. In some implementations, the energy source 119 may include a combination of fuel tanks, batteries, capacitors, and/or flywheels.

The transmission 120 may transmit mechanical power from the engine/motor 118 to the wheels/tires 121 and/or other possible systems of the vehicle 100. As such, the transmission 120 may include a gearbox, a clutch, a differential, and a drive shaft, among other possible components. A drive shaft may include axles that connect to one or more of the wheels/tires 121.

The wheels/tires 121 of the vehicle 100 may have various configurations within example implementations. For instance, the vehicle 100 may exist in a unicycle, bicycle/motorcycle, tricycle, or car/truck four-wheel format, among other possible configurations. As such, the wheels/tires 121 may connect to the vehicle 100 in various ways and can exist in different materials, such as metal and rubber.

The sensor system 104 can include various types of sensors or sensor devices, such as a Global Positioning System (GPS) 122, an inertial measurement unit (IMU) 124, a radar 126, a laser rangefinder/lidar sensor 128, a camera 130, a steering sensor 123, and a throttle/brake sensor 125, among other possible sensors. In some implementations, the sensor system 104 may also include sensors configured to monitor internal systems of the vehicle 100 (e.g., 02 monitor, fuel gauge, engine oil temperature, brake wear).

The GPS 122 may include a transceiver operable to provide information regarding the position of vehicle 100 with respect to the Earth. The IMU 124 may have a configuration that uses one or more accelerometers and/or gyroscopes and may sense position and orientation changes of vehicle 100 based on inertial acceleration. For example, the IMU 124 may detect a pitch and yaw of the vehicle 100 while the vehicle 100 is stationary or in motion.

The radar 126 may represent one or more systems configured to use radio signals to sense objects, including the speed and heading of the objects, within the local environment of the vehicle 100. As such, the radar 126 may include antennas configured to transmit and receive radio signals. In some implementations, the radar 126 may correspond to a mountable radar unit or system configured to obtain measurements of the surrounding environment of the vehicle 100.

The laser rangefinder/lidar 128 may include one or more laser sources, a laser scanner, and one or more detectors or sensors, among other system components, and may operate in a coherent mode (e.g., using heterodyne detection) or in an incoherent detection mode. In some embodiments, the one or more detectors or sensor of the laser rangefinder/lidar 128 may include one or more photodetectors. In some examples, the photodetectors may be capable of detecting single photon avalanche diodes (SPAD). Further, such photodetectors can be arranged (e.g., through an electrical connection in series) into an array (e.g., as in a silicon photomultiplier (SiPM)).

The camera 130 may include one or more devices (e.g., a still camera or video camera) configured to capture images of the environment of the vehicle 100. In some examples, the camera may include an image sensor configured to capture a series of images (e.g., image frames) in a time-sequential manner. The image sensor may capture images at a particular rate or at a particular time interval between successive frame exposures.

The steering sensor 123 may sense a steering angle of the vehicle 100, which may involve measuring an angle of the steering wheel or measuring an electrical signal representative of the angle of the steering wheel. In some implementations, the steering sensor 123 may measure an angle of the wheels of the vehicle 100, such as detecting an angle of the wheels with respect to a forward axis of the vehicle 100. The steering sensor 123 may also be configured to measure a combination (or a subset) of the angle of the steering wheel, electrical signal representing the angle of the steering wheel, and the angle of the wheels of the vehicle 100.

The throttle/brake sensor 125 may detect the position of either the throttle position or brake position of the vehicle 100. For instance, the throttle/brake sensor 125 may measure the angle of both the gas pedal (throttle) and brake pedal or may measure an electrical signal that could represent, for instance, an angle of a gas pedal (throttle) and/or an angle of a brake pedal. The throttle/brake sensor 125 may also measure an angle of a throttle body of the vehicle 100, which may include part of the physical mechanism that provides modulation of the energy source 119 to the engine/motor 118 (e.g., a butterfly valve or carburetor). Additionally, the throttle/brake sensor 125 may measure a pressure of one or more brake pads on a rotor of the vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of the vehicle 100. In other implementations, the throttle/brake sensor 125 may be configured to measure a pressure applied to a pedal of the vehicle, such as a throttle or brake pedal.

The control system 106 may include components configured to assist in navigating the vehicle 100, such as a steering unit 132, a throttle 134, a brake unit 136, a sensor fusion algorithm 138, a computer vision system 140, a navigation/pathing system 142, and an obstacle avoidance system 144. More specifically, the steering unit 132 may be operable to adjust the heading of the vehicle 100, and the throttle 134 may control the operating speed of the engine/motor 118 to control the acceleration of the vehicle 100. The brake unit 136 may decelerate vehicle 100, which may involve using friction to decelerate the wheels/tires 121. In some implementations, brake unit 136 may convert kinetic energy of the wheels/tires 121 to electric current for subsequent use by a system or systems of the vehicle 100.

The sensor fusion algorithm 138 of the control system 106 may include a Kalman filter, Bayesian network, or other algorithms that can process data from the sensor system 104. In some implementations, the sensor fusion algorithm 138 may provide assessments based on incoming sensor data, such as evaluations of individual objects and/or features, evaluations of a particular situation, and/or evaluations of potential impacts within a given situation.

The computer vision system 140 of the control system 106 may include hardware and software operable to process and analyze images in an effort to determine objects, environmental objects (e.g., stop lights, road way boundaries, etc.), and obstacles. As such, the computer vision system 140 may use object recognition, Structure From Motion (SFM), video tracking, and other algorithms used in computer vision, for instance, to recognize objects, map an environment, track objects, estimate the speed of objects, etc.

The navigation/pathing system 142 of the control system 106 may determine a driving path for the vehicle 100, which may involve dynamically adjusting navigation during operation. As such, the navigation/pathing system 142 may use data from the sensor fusion algorithm 138, the GPS 122, and maps, among other sources to navigate the vehicle 100. The obstacle avoidance system 144 may evaluate potential obstacles based on sensor data and cause systems of the vehicle 100 to avoid or otherwise negotiate the potential obstacles.

As shown in FIG. 1, the vehicle 100 may also include peripherals 108, such as a wireless communication system 146, a touchscreen 148, a microphone 150, and/or a speaker 152. The peripherals 108 may provide controls or other elements for a user to interact with the user interface 116. For example, the touchscreen 148 may provide information to users of the vehicle 100. The user interface 116 may also accept input from the user via the touchscreen 148. The peripherals 108 may also enable the vehicle 100 to communicate with devices, such as other vehicle devices.

The wireless communication system 146 may wirelessly communicate with one or more devices directly or via a communication network. For example, wireless communication system 146 could use 3G cellular communication, such as code-division multiple access (CDMA), evolution-data optimized (EVDO), global system for mobile communications (GSM)/general packet radio service (GPRS), or cellular communication, such as 4G worldwide interoperability for microwave access (WiMAX) or long-term evolution (LTE), or 5G. Alternatively, wireless communication system 146 may communicate with a wireless local area network (WLAN) using WIFI® or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

The vehicle 100 may include the power supply 110 for powering components. The power supply 110 may include a rechargeable lithium-ion or lead-acid battery in some implementations. For instance, the power supply 110 may include one or more batteries configured to provide electrical power. The vehicle 100 may also use other types of power supplies. In an example implementation, the power supply 110 and the energy source 119 may be integrated into a single energy source.

The vehicle 100 may also include the computer system 112 to perform operations, such as operations described therein. As such, the computer system 112 may include at least one processor 113 (which could include at least one microprocessor) operable to execute instructions 115 stored in a non-transitory computer readable medium, such as the data storage 114. In some implementations, the computer system 112 may represent a plurality of computing devices that may serve to control individual components or subsystems of the vehicle 100 in a distributed fashion.

In some implementations, the data storage 114 may contain instructions 115 (e.g., program logic) executable by the processor 113 to execute various functions of the vehicle 100, including those described above in connection with FIG. 1. The data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by the vehicle 100 and the computer system 112 during the operation of the vehicle 100 in the autonomous, semi-autonomous, and/or manual modes.

The vehicle 100 may include the user interface 116 for providing information to or receiving input from a user of the vehicle 100. The user interface 116 may control or enable control of content and/or the layout of interactive images that could be displayed on the touchscreen 148. Further, the user interface 116 could include one or more input/output devices within the set of peripherals 108, such as the wireless communication system 146, the touchscreen 148, the microphone 150, and the speaker 152.

The computer system 112 may control the function of the vehicle 100 based on inputs received from various subsystems (e.g., the propulsion system 102, the sensor system 104, and the control system 106), as well as from the user interface 116. For example, the computer system 112 may utilize input from the sensor system 104 in order to estimate the output produced by the propulsion system 102 and the control system 106. Depending upon the implementation, the computer system 112 could be operable to monitor many aspects of the vehicle 100 and its subsystems. In some implementations, the computer system 112 may disable some or all functions of the vehicle 100 based on signals received from the sensor system 104.

The components of the vehicle 100 could be configured to work in an interconnected fashion with other components within or outside their respective systems. For instance, in an example implementation, the camera 130 could capture a plurality of images that could represent information about a state of an environment of the vehicle 100 operating in an autonomous mode. The state of the environment could include parameters of the road on which the vehicle is operating. For example, the computer vision system 140 may be able to recognize the slope (grade) or other features based on the plurality of images of a roadway. Additionally, the combination of the GPS 122 and the features recognized by the computer vision system 140 may be used with map data stored in the data storage 114 to determine specific road parameters. Further, the radar unit 126 may also provide information about the surroundings of the vehicle. In other words, a combination of various sensors (which could be termed input-indication and output-indication sensors) and the computer system 112 could interact to provide an indication of an input provided to control a vehicle or an indication of the surroundings of a vehicle.

In some implementations, the computer system 112 may make a determination about various objects based on data that is provided by systems other than the radio system. For example, the vehicle 100 may have lasers or other optical sensors configured to sense objects in a field of view of the sensors (e.g., vehicle). The computer system 112 may use the outputs from the various sensors to determine information about objects in a field of view of the vehicle, and may determine distance and direction information to the various objects. The computer system 112 may also determine whether objects are desirable or undesirable based on the outputs from the various sensors.

Although FIG. 1 shows various components of the vehicle 100, i.e., the wireless communication system 146, the computer system 112, the data storage 114, and the user interface 116, as being integrated into the vehicle 100, one or more of these components could be mounted or associated separately from the vehicle 100. For example, the data storage 114 could, in part or in full, exist separate from the vehicle 100. Thus, the vehicle 100 could be provided in the form of device elements that may be located separately or together. The device elements that make up the vehicle 100 could be communicatively coupled together in a wired and/or wireless fashion.

Figure 2:
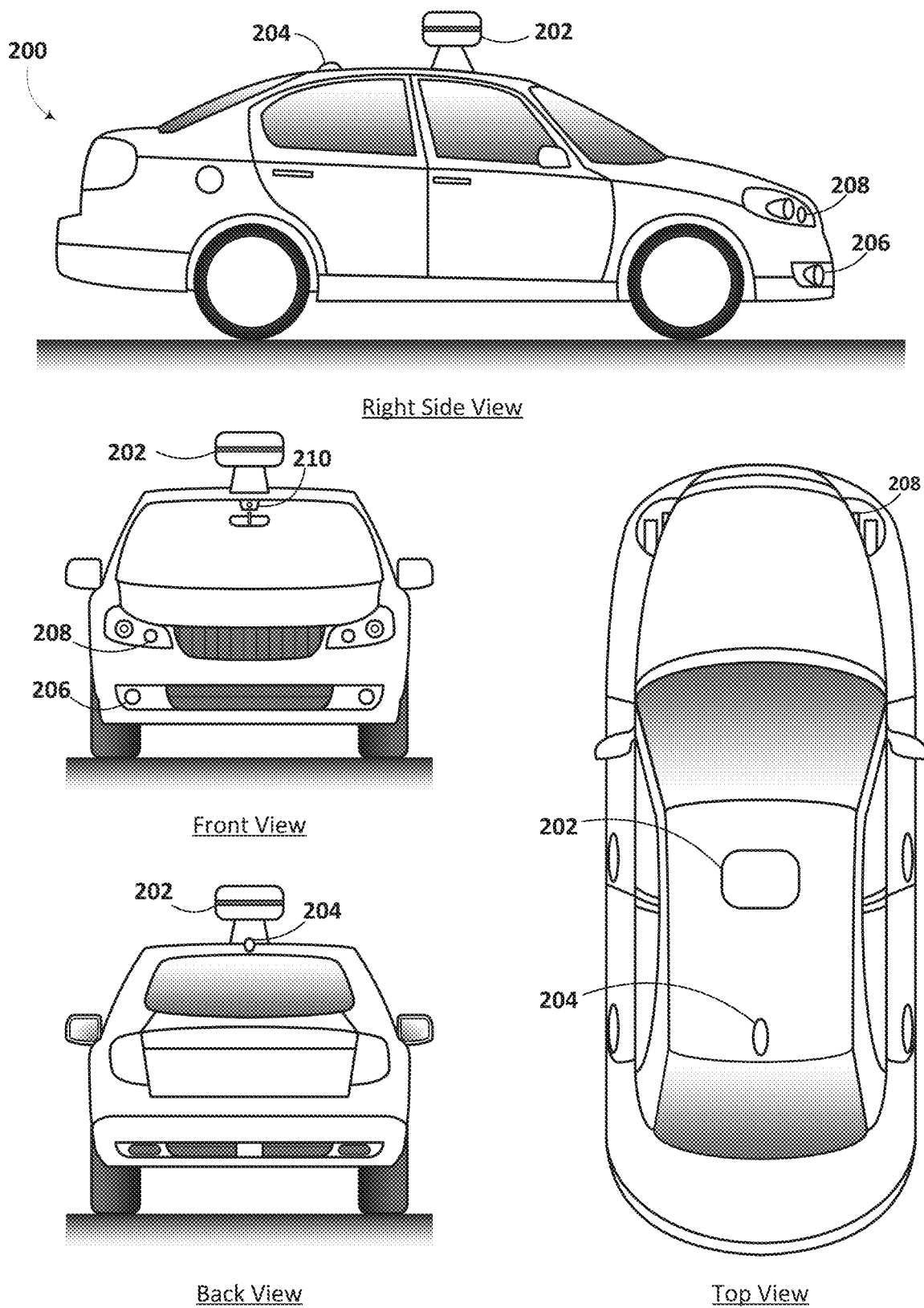
FIG. 2 is a conceptual illustration of a configuration of a vehicle, according to an example implementation.

FIG. 2 depicts an example physical configuration of the vehicle 200, which may represent one possible physical configuration of vehicle 100 described in reference to FIG. 1. Depending on the implementation, the vehicle 200 may include the sensor unit 202, the wireless communication system 204, the radio unit 206, the deflectors 208, and the camera 210, among other possible components. For instance, the vehicle 200 may include some or all of the elements of components described in FIG. 1. Although the vehicle 200 is depicted in FIG. 2 as a car, the vehicle 200 can have other configurations within examples, such as a truck, a van, a semi-trailer truck, a motorcycle, a golf cart, an off-road vehicle, or a farm vehicle, among other possible examples.

The sensor unit 202 may include one or more sensors configured to capture information of the surrounding environment of the vehicle 200. For example, the sensor unit 202 may include any combination of cameras, radars, LIDARs, range finders, radio devices (e.g., Bluetooth and/or 802.11), and acoustic sensors, among other possible types of sensors. In some implementations, the sensor unit 202 may include one or more movable mounts operable to adjust the orientation of sensors in the sensor unit 202. For example, the movable mount may include a rotating platform that can scan sensors so as to obtain information from each direction around the vehicle 200. The movable mount of the sensor unit 202 may also be movable in a scanning fashion within a particular range of angles and/or azimuths.

In some implementations, the sensor unit 202 may include mechanical structures that enable the sensor unit 202 to be mounted atop the roof of a car. Additionally, other mounting locations are possible within examples.

The wireless communication system 204 may have a location relative to the vehicle 200 as depicted in FIG. 2, but can also have different locations within implementations. The wireless communication system 200 may include one or more wireless transmitters and one or more receivers that may communicate with other external or internal devices. For example, the wireless communication system 204 may include one or more transceivers for communicating with a user's device, other vehicles, and roadway elements (e.g., signs, traffic signals), among other possible entities. As such, the vehicle 200 may include one or more vehicular communication systems for facilitating communications, such as dedicated short-range communications (DSRC), radio frequency identification (RFID), and other proposed communication standards directed towards intelligent transport systems.

The camera 210 may have various positions relative to the vehicle 200, such as a location on a front windshield of vehicle 200. As such, the camera 210 may capture images of the environment of the vehicle 200. As illustrated in FIG. 2, the camera 210 may capture images from a forward-looking view with respect to the vehicle 200, but other mounting locations (including movable mounts) and viewing angles of the camera 210 are possible within implementations. In some examples, the camera 210 may correspond to one or more visible light cameras. Alternatively or additionally, the camera 210 may include infrared sensing capabilities. The camera 210 may also include optics that may provide an adjustable field of view.

Figure 3:
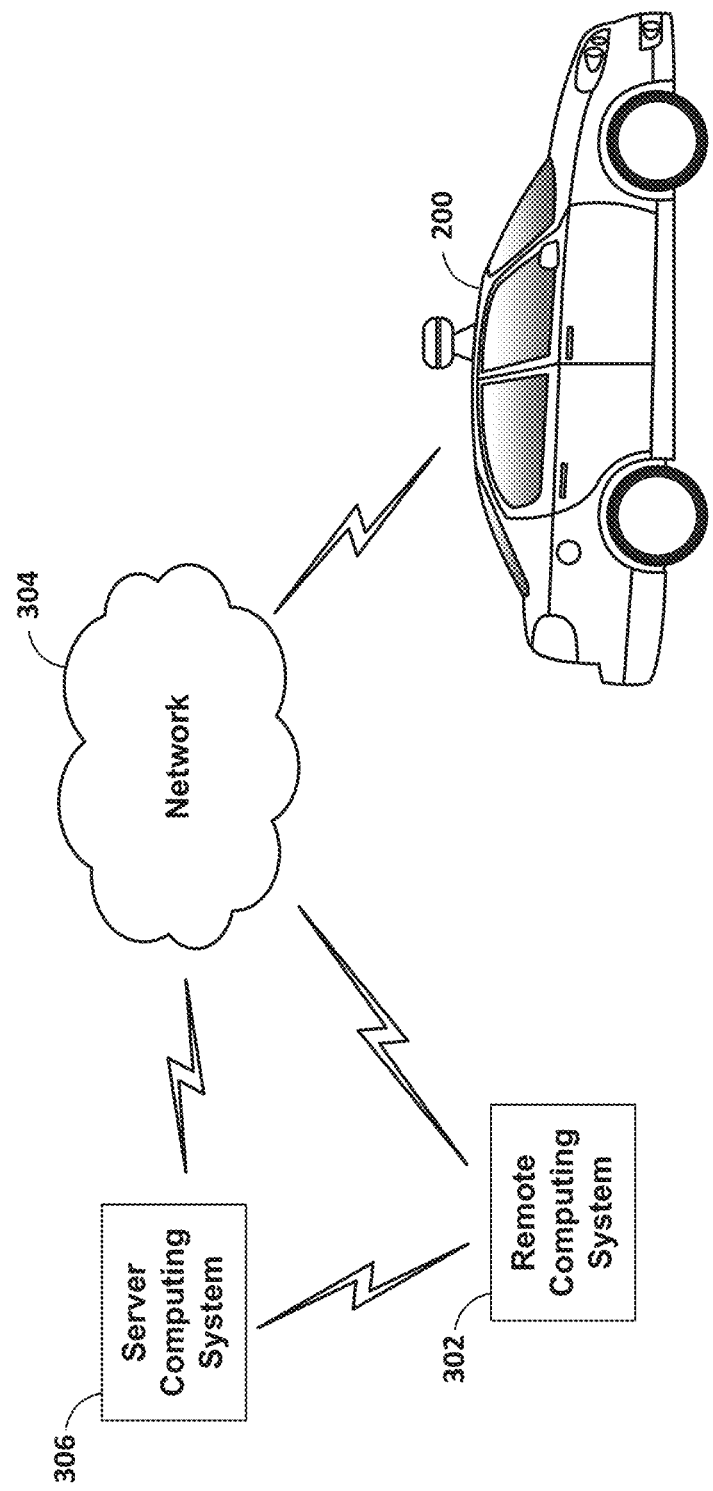
FIG. 3 is a conceptual illustration of wireless communication between various computing systems related to an autonomous vehicle, according to an example implementation.

FIG. 3 is a conceptual illustration of wireless communication between various computing systems related to an autonomous vehicle, according to an example implementation. In particular, wireless communication may occur between a remote computing system 302 and the vehicle 200 via a network 304. Wireless communication may also occur between a server computing system 306 and the remote computing system 302, and between the server computing system 306 and the vehicle 200.

The vehicle 200 can correspond to various types of vehicles capable of transporting passengers or objects between locations and may take the form of any one or more of the vehicles discussed above. In some instances, the vehicle 200 may operate in an autonomous mode that enables a control system to safely navigate the vehicle 200 between destinations using sensor measurements. When operating in an autonomous mode, the vehicle 200 may navigate with or without passengers. As a result, the vehicle 200 may pick up and drop off passengers between desired destinations.

The remote computing system 302 may represent any type of device related to remote assistance techniques, including but not limited to those described herein. Within examples, the remote computing system 302 may represent any type of device configured to (i) receive information related to the vehicle 200, (ii) provide an interface through which a human operator can in turn perceive the information and input a response related to the information, and (iii) transmit the response to vehicle 200 or to other devices. The remote computing system 302 may take various forms, such as a workstation, a desktop computer, a laptop, a tablet, a mobile phone (e.g., a smart phone), and/or a server. In some examples, the remote computing system 302 may include multiple computing devices operating together in a network configuration.

The remote computing system 302 may include one or more subsystems and components similar or identical to the subsystems and components of vehicle 200. At a minimum, the remote computing system 302 may include a processor configured for performing various operations described herein. In some implementations, the remote computing system 302 may also include a user interface that includes input/output devices, such as a touchscreen and a speaker. Other examples are possible as well.

The network 304 represents infrastructure that enables wireless communication between the remote computing system 302 and the vehicle 200. The network 304 also enables wireless communication between the server computing system 306 and the remote computing system 302, and between the server computing system 306 and the vehicle 200.

The position of the remote computing system 302 can vary within examples. For instance, the remote computing system 302 may have a remote position from the vehicle 200 that has a wireless communication via the network 304. In another example, the remote computing system 302 may correspond to a computing device within the vehicle 200 that is separate from the vehicle 200, but with which a human operator can interact while a passenger or driver of the vehicle 200. In some examples, the remote computing system 302 may be a computing device with a touchscreen operable by the passenger of the vehicle 200.

In some implementations, operations described herein that are performed by the remote computing system 302 may be additionally or alternatively performed by the vehicle 200 (i.e., by any system(s) or subsystem(s) of the vehicle 200). In other words, the vehicle 200 may be configured to provide a remote assistance mechanism with which a driver or passenger of the vehicle can interact.

The server computing system 306 may be configured to wirelessly communicate with the remote computing system 302 and the vehicle 200 via the network 304 (or perhaps directly with the remote computing system 302 and/or the vehicle 200). The server computing system 306 may represent any computing device configured to receive, store, determine, and/or send information relating to the vehicle 200 and the remote assistance thereof. As such, the server computing system 306 may be configured to perform any operation(s), or portions of such operation(s), that is/are described herein as performed by the remote computing system 302 and/or the vehicle 200. Some implementations of wireless communication related to remote assistance may utilize the server computing system 306, while others may not.

The server computing system 306 may include one or more subsystems and components similar or identical to the subsystems and components of the remote computing system 302 and/or the vehicle 200, such as a processor configured for performing various operations described herein, and a wireless communication interface for receiving information from, and providing information to, the remote computing system 302 and the vehicle 200.

The various systems described above may perform various operations. For example, a computing or sensor system (e.g., the remote computing system 302, the server computing system 306, or a computing system local to the vehicle 200) may operate sensors or sensor devices to capture sensor information of the environment of an autonomous vehicle.

In general, at least one computing device or system will be able to analyze the sensor information and possibly control the autonomous vehicle.

In some implementations, to facilitate autonomous operation, a vehicle (e.g., the vehicle 200) may receive data representing objects in an environment in which the vehicle operates (also referred to herein as "environment data") in a variety of ways. A sensor or computing system on the vehicle may provide the environment data representing objects of the environment. For example, the vehicle may have various sensors, including a camera, a radar sensor, a laser range finder/lidar sensor, an image sensor, a microphone, and other sensors. Each of these sensors may communicate data to a computing device (e.g., a processor) in the vehicle about information each respective sensor receives.

In some implementations, the computing device (e.g., a controller or processor) or computing system may be able to combine information from the various sensors in order to make further determinations of the environment of the vehicle. For example, the processing system may combine data from a lidar sensor or a radar sensor and an image sensor to determine if another vehicle or pedestrian is in front of the autonomous vehicle. In other implementations, other combinations of sensor data may be used by the computing system to make determinations about the environment.

While operating in an autonomous mode, the vehicle may control its operation with little-to-no human input. For example, a human-operator may enter an address into the vehicle and the vehicle may then be able to drive, without further input from the human (e.g., the human does not have to steer or touch the brake/gas pedals), to the specified destination. Further, while the vehicle is operating autonomously, the sensor system may be receiving environment data. The computing or processing system of the vehicle may alter the control of the vehicle based on the environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the environment (e.g., if there is actually a stop sign or if there is actually no stop sign present), (ii) confirm whether the vehicle's identification of the object is correct, (iii) correct the identification if the identification was incorrect and/or (iv) provide a supplemental instruction (or modify a present instruction) for the autonomous vehicle. Remote assistance tasks may also include the human operator providing an instruction to control operation of the vehicle (e.g., instruct the vehicle to stop at a stop sign if the human operator determines that the object is a stop sign), although in some scenarios, the vehicle itself may control its own operation based on the human operator's feedback related to the identification of the object.

To facilitate this operation, the vehicle may analyze the environment data representing objects of the environment to determine at least one object having a detection confidence below a threshold. A computing device or processor in the vehicle may be configured to detect various objects of the environment based on environment data from various sensors. For example, in one implementation, the computing device may be configured to detect objects that may be important for the vehicle to recognize. Such objects may include pedestrians, street signs, other vehicles, indicator signals on other vehicles, and other various objects detected in the captured environment data.

The detection confidence may be indicative of a likelihood that the determined object is correctly identified in the environment, or is present in the environment. For example, the processor may perform object detection of objects within image data in the received environment data, and determine that the at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the environment in various ways depending on the source of the environment data. In some implementations, the environment data may be received from a camera and include image or video data. In other implementations, the environment data may be received from a lidar sensor. The vehicle may analyze the captured image or video data to identify objects in the image or video data. The methods and apparatuses may be configured to monitor image and/or video data for the presence of objects of the environment. In other implementations, the environment data may be radar, audio, or other data. The vehicle may be configured to identify objects of the environment based on the radar, audio, or other data.

In some implementations, the techniques the vehicle uses to detect objects may be based on a set of known data. For example, data related to environmental objects may be stored to a memory located in the vehicle. The vehicle may compare received data to the stored data to determine objects. In other implementations, the vehicle may be configured to determine objects based on the context of the data. For example, street signs related to construction may generally have an orange color. Accordingly, the vehicle may be configured to detect objects that are orange, and located near the side of roadways as construction-related street signs. Additionally, when the processing system of the vehicle detects objects in the captured data, it also may calculate a confidence for each object.

Further, the vehicle may also have a confidence threshold. The confidence threshold may vary depending on the type of object being detected. For example, the confidence threshold may be lower for an object that may require a quick responsive action from the vehicle, such as brake lights on another vehicle. However, in other implementations, the confidence threshold may be the same for all detected objects. When the confidence associated with a detected object is greater than the confidence threshold, the vehicle may assume the object was correctly recognized and responsively adjust the control of the vehicle based on that assumption.

When the confidence associated with a detected object is less than the confidence threshold, the actions that the vehicle takes may vary. In some implementations, the vehicle may react as if the detected object is present despite the low confidence level. In other implementations, the vehicle may react as if the detected object is not present.

When the vehicle detects an object of the environment, it may also calculate a confidence associated with the specific detected object. The confidence may be calculated in various ways depending on the implementation. In one example, when detecting objects of the environment, the vehicle may compare environment data to predetermined data relating to known objects. The closer the match between the environment data to the predetermined data, the higher the confidence. In other implementations, the vehicle may use mathematical analysis of the environment data to determine the confidence associated with the objects.

In response to determining that an object has a detection confidence that is below the threshold, the vehicle may transmit, to the remote computing system, a request for remote assistance with the identification of the object. As discussed above, the remote computing system may take various forms. For example, the remote computing system may be a computing device within the vehicle that is separate from the vehicle, but with which a human operator can interact while a passenger or driver of the vehicle, such as a touchscreen interface for displaying remote assistance information. Additionally or alternatively, as another example, the remote computing system may be a remote computer terminal or other device that is located at a location that is not near the vehicle.

The request for remote assistance may include the environment data that includes the object, such as image data, audio data, etc. The vehicle may transmit the environment data to the remote computing system over a network (e.g., network 304), and in some implementations, via a server (e.g., server computing system 306). The human operator of the remote computing system may in turn use the environment data as a basis for responding to the request.

In some implementations, when the object is detected as having a confidence below the confidence threshold, the object may be given a preliminary identification, and the vehicle may be configured to adjust the operation of the vehicle in response to the preliminary identification. Such an adjustment of operation may take the form of stopping the vehicle, switching the vehicle to a human-controlled mode, changing a velocity of vehicle (e.g., a speed and/or direction), among other possible adjustments.

In other implementations, even if the vehicle detects an object having a confidence that meets or exceeds the threshold, the vehicle may operate in accordance with the detected object (e.g., come to a stop if the object is identified with high confidence as a stop sign), but may be configured to request remote assistance at the same time as (or at a later time from) when the vehicle operates in accordance with the detected object.

Figure 4:
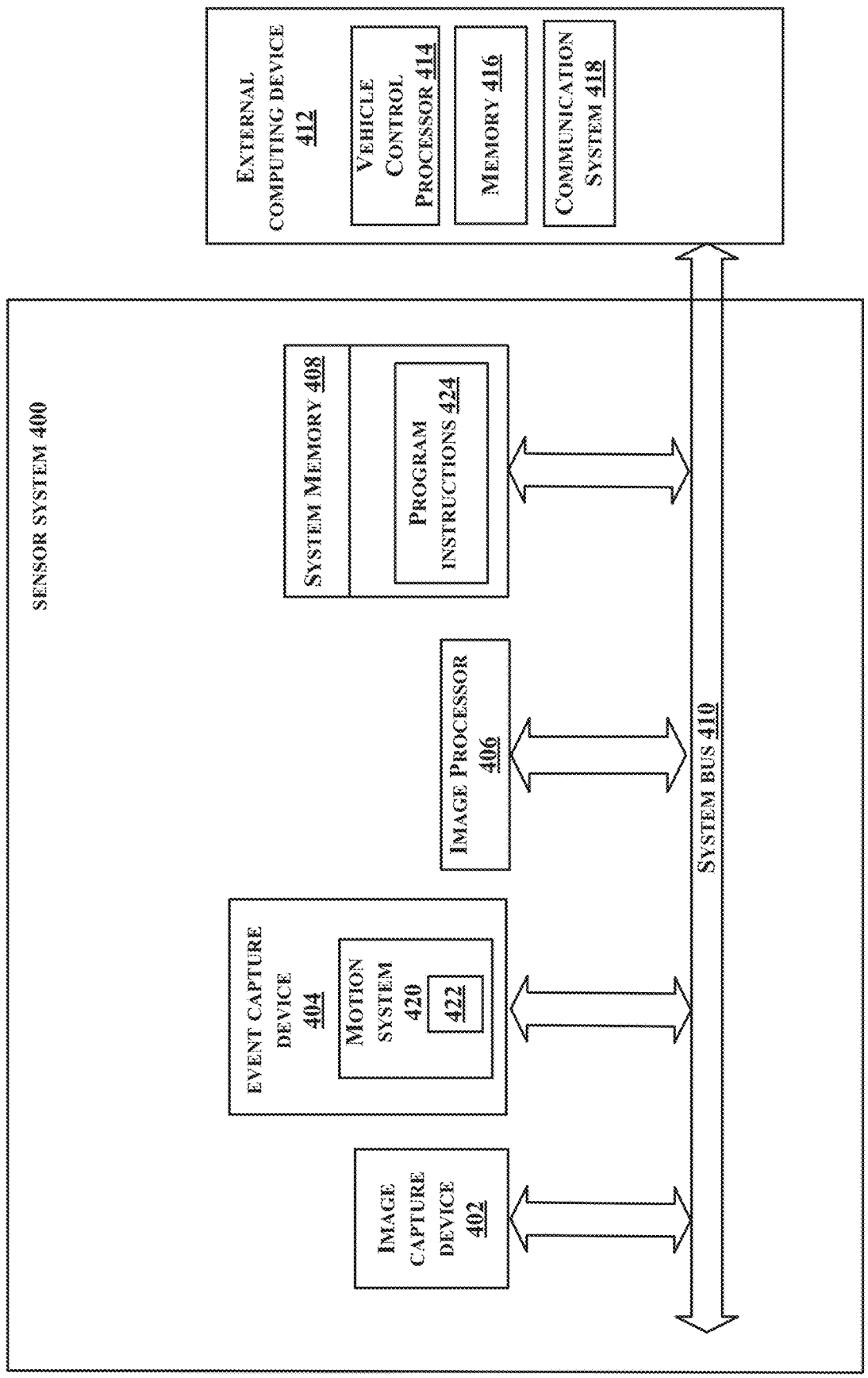
FIG. 4 is a simplified block diagram depicting components of a sensor system, according to an example implementation.

FIG. 4 is a simplified block diagram depicting components of an example sensor system 400 (e.g., a camera system) of a vehicle for capturing sensor information about an environment surrounding a vehicle. In some examples, the vehicle may include more than one sensor system. For example, the vehicle may include a sensor system mounted to the top of the vehicle in a sensor dome and may include another sensor system located behind the windshield of the vehicle. In other examples, the various sensor systems may be located in various different positions throughout the vehicle.

As shown in FIG. 4, the sensor system 400 may include an image capture device 402, an event capture device 404, a processor 406, and a system memory 408. The sensor system 400 may be configured to capture or acquire sensor data (e.g., image data and/or event data) and transmit the sensor data to the components and/or systems of the vehicle. In some implementations, the processor 406 may comprise multiple processors and the system memory 408 may or may not be located within the same physical housing as the processor 406. Although various components of sensor system 400 are shown as distributed components, it should be understood that any of such components may be physically integrated and/or distributed according to a desired configuration of the sensor system 400.

Further, the sensor system 400 may include a system bus 410. Although depicted as a single bus, the system bus 410 may be composed of multiple buses. The system bus 410 may be implemented using any suitable communication technology and may include connection technology that allows multiple components to share the system bus 410. For example, the system bus 410 may be configured to enable the transfer of image frames (e.g., images) between the image capture device 402, the processor 406, and/or the system memory 408. The system bus 410 may also enable the transfer of event data between the event capture device 404, the processor 406, and/or the system memory 408. Further, the system bus 408 may communicatively couple the sensor system 400 with an external computing device 412. For example, the system bus 410 may enable the image capture device 402, the event capture device 404, and/or the processor 406 to send sensor data (e.g., image and/or event data) to the external computing device 412.

The external computing device 412 may include a vehicle-control processor 414, a memory 416, a communication system 418, and other components. The external computing system 412 may be located in the autonomous vehicle. The communication system 418 of the external computing device 412 may be configured to communicate data between the vehicle and a remote device or computer server. The memory 416 of the external computing device 412 may have a larger capacity than the system memory 408 of the sensor system 400. The memory 416 may also be used for longer term storage than the system memory 408. In some examples, sensor data received by the external computing device 412 may be used by a navigation system (e.g., a navigation processor) of the vehicle. Further, the external computing device 412 may be configured to control various operations of the sensor system 400, among other options.

The image capture device 402 of the sensor system 400 may be configured to capture image data and transfer the image data to the processor 406 and/or the system memory 408. In some examples, the image capture device 402 may include a camera. The image capture device 402 may be implemented using an image sensor (e.g., a frame-based image sensor). The image sensor may comprise a charge coupled device (CCD), a complementary metal oxide semiconductor (CMOS) image sensor, or other similar type of image sensor. The image sensor may comprise a two-dimensional grid or array of pixels or sensor elements configured to capture images or image frames of a scene. The two-dimensional array may have a width of x pixels and a height of y pixels.

During operation, the pixels or sensor elements of the image capture device 402 may receive light by way of an optical system and convert the light into electrical signals. The electrical signals may correspond to the color and intensity of light that is received by the pixels. In order to construct or form an image frame (e.g., image) of a scene or a portion of the scene, the pixels of the image sensor 402 may be scanned or sampled. When the pixels of the image capture device 402 are sampled, the values associated with each pixel may be captured by the image capture device 402 to generate or form a two-dimensional image frame (e.g., image). The image frame may represent a plurality of pixel values, and each pixel value may correspond to a set of pixel values, such as depth values, photometric values (e.g., red-green-blue (RGB) values, intensity values, chroma values, saturation values, etc.), or a combination thereof.

The pixels of the image capture device 402 may be sampled at a fixed sampling or frame rate. In one example, the pixels may be sampled or scanned one row at a time. Sampling in this way is known as a rolling shutter. Further, the pixels may be sampled in an iterative fashion by incrementally adjusting the sample row. In some examples, the iterations may be linear, that is after each row is sampled, the next row is subsequently sampled. In other examples, the sampling may be performed in different ways. For example, the pixels of the image capture device 402 may be sampled more than one row at a time. Further, the sampling may be performed on columns in a sequential or non-sequential order.

The image capture device 402 may have a particular pixel density (e.g., 40 megapixel (MP), 32 MP, 16 MP, 8 MP) as well as a color filter array (CFA) configuration to support different image processing techniques (e.g., inclusion of a Bayer CFA to support red, green, and blue (RGB) image processing and exclusion of a CFA to support monochromatic-image processing). For example, the image capture device 402 may include a CFA that overlays the pixels of the image captured device 402 and limits intensities, as associated with color wavelengths, of light recorded through the pixel elements. The CFA may comprise a Bayer CFA, which filters light according to a red wavelength, a blue wavelength, and a green wavelength. Light from the environment, when filtered through the Bayer CFA, may generate an image or image frame that can be referred to as a Bayer image or a Bayer image frame. Further, the image capture device 402 may include a plurality of frame-based image sensors for capturing an image (e.g., a dual image sensor).

Referring still to FIG. 4, the event capture device 404 of the sensor system 400 may be configured to generate event data and transfer the event data to the processor 406 and/or the system memory 408. The event capture device 404 may detect image dynamics asynchronously rather than at a predetermined frame rate. The event capture device 404 may comprise an event-based camera configured to acquire event data associated with an event in the environment. In some embodiments, the event capture device 404 may include an event-based sensor to detect image dynamics. Unlike a frame-based image sensor, the event-based sensor may output event data (e.g., event signals) from the pixels or sensor elements in which an intensity of light changes, rather than scanning outputs of the pixels or sensing elements in frame units. For example, the event-based sensor may output a stream of asynchronous event data in response to detecting an occurrence of an event (e.g., an environmental condition, a change in light intensity, etc.).

In some implementations, the event capture device 404 may comprise a dynamic vision sensor (DVS). The DVS may include an array of a plurality of pixels or sensor elements. The array may be a two-dimensional array that includes the pixels arranged in two dimensions, such as columns and rows. Each pixel may include a photoreceptor and pixel circuitry configured to output sensor or event data (e.g., event signals). The DVS may sense changes in pixel illumination (e.g., an event) and may output a stream of asynchronous event data that represents the temporal change in light intensity upon each pixel.

During operation, each pixel of the event capture device 404 may receive a portion of light from the environment and may be capable of sensing or detecting changes in pixel illumination incident on a pixel (e.g., changes in an environmental condition, changes in an intensity of electromagnetic energy, or changes in an intensity of visible light). The pixels may generate signals corresponding to a change in the intensity of the light that is equal to or greater than a threshold. The amount of illumination change required to trigger an event may be fixed or adjustable over a suitable range of values. For example, when pixels of the event capture device 404 sense a change in illumination greater than a threshold indicating an event, the event capture device 404 may output a stream of asynchronous event data (e.g., values of the pixels that have changed) that represents the temporal changes in light intensity incident upon the pixels. However, the pixels of the event capture device 404 that have undergone no change, or changed less than the threshold amount, may not output event data. As such, events associated with changes in any pixel of the event capture device 404 can be sensed with a much greater temporal resolution than with a frame-based sensor.

The event capture device 404 of the sensor system 400 may output different event data based on the type of event sensed by the event capture device 404. For example, when the event capture device 404 senses an event in which an intensity of light increases at a predetermined pixel, the event capture device 404 may output an ON event corresponding to the particular pixel. When the event capture sensor 404 senses an event in which the intensity of light decreases at a particular pixel, the event capture device may output an OFF event corresponding to the particular pixel.

Further, the event capture device 404 may output event data that includes timing information (e.g., a time stamp) indicating a time at which an event (e.g., changes in the intensity of light) occurs, location information indicating a location or address of the pixel that senses the event, the type of sensed event, and a binary value indicating a positive or negative change in luminance associated with the event. The event capture device 404 may not generate event data for pixels that sense a relatively constant light intensity, which may often be a substantial amount of pixels. Thus, in some instances, the event capture device 404 may transfer a substantially lower amount of event data to a computing device for further processing as compared to frame-based sensors.

The event capture device 404 may be configured to detect movement in a scene. For example, an event in which light received by the event capture device 404 changes may occur due to a movement of objects and backgrounds. The movement of the objects and backgrounds may cause changes of light intensity incident on the pixels of the event capture device 404 due to a variation in reflectance of the objects and backgrounds in the scene. The event capture device 404 may sense the temporal change of light due to the movement of the objects and backgrounds in the scene by the change of light intensity on the pixels of the event capture device 404. For example, when the objects and/or backgrounds move in the scene, the light reflected by the object and/or background may change in response to the movement. The event capture device 404 may sense the pixel-level changes caused by movement of the objects and backgrounds in a scene at the time they occur. The event capture device 404 may generate event data in response to sensing at least a portion of the objects and/or backgrounds in the scene and may output the event data. Thus, the output of the event capture device may consist of a continuous flow of pixel events that represent the objects and backgrounds in the scene.

Further, stationary objects and backgrounds in a scene may be moving relative to the event capture device 404 causing associated changes in relative pixel intensity values of the event capture device 404. For example, when the event capture device 404 is mounted to a vehicle, the event capture device 404 may be moving relative to stationary or still objects as the vehicle travels in the environment. As such, the movement of objects may include the movement of the objects themselves and/or relative movement between the objects and the event capture device 404. Further, the background of a scene may move relative to the event capture device 404 when the vehicle is in motion.

The event capture device 404 may be configured to only output event data about variable or dynamic objects in the field of view of the event capture device 404 and may not include event data about objects that are substantially stationary or static (e.g., substantially motionless) relative to the event capture device 404 as the vehicle travels in the environment. For example, when an object is near the center of the field of view of the event capture device and the vehicle is traveling in the pointing direction of the event capture device, the event capture device may not be able to detect or sense the object because the object may be static or stationary relative to the event capture device. As a result, the intensity of light reflected from the object on the pixels of the event capture device 404 may not substantially change or may be substantially static. For example, an object that is static or stationary relative to the event capture device 404 may have very few pixels whose relative intensity values are above a threshold value. Thus, the event capture device 404 may not sense a light change event associated with the object.

In some examples, the event capture device 404 may not detect moving or stationary objects in front of the vehicle when the vehicle is traveling in the pointing direction of the event capture device 404. In other examples, the event capture device may not detect objects that are traveling substantially parallel to the vehicle at substantially the same speed. Further, the event capture device 404 may not detect objects and/or backgrounds in a scene when the vehicle is substantially stationary. As a result, the processor 406 may not receive event data from the event capture device 404 to determine information about such objects and backgrounds. This inability could, in turn, adversely affect subsequent autonomous operations.

In some embodiments, the event image detector 404 may include a motion system 420 configured to cause movement of the event captured device 404. The motion system 420 may enable the event capture device 404 to sense the spatial differential value of light for objects that are relatively stationary or static relative to the event capture device 404. The motion system 420 may be configured to move the event capture device 404, or components thereof (e.g., vision sensor), from a substantially stationary state or position to a non-stationary state (e.g., a motion state). As a result, the event capture device 404 may be able to detect objects and backgrounds in the field of view of the event capture device that are stationary in the scene or that are stationary or static relative to the event capture device 404 as further described below.

The motion system 420 of the event capture device 404 may include one or more motors or actuators 422. The motor system 420 may be configured to control the one or more motors 422 according to a desired position, velocity, or acceleration. The one or more motors 422 may rotate, oscillate, move, and/or change the orientation of the event capture device 404. For example, the one or more motors 422 may cause the event capture device 404 to move in a horizontal, vertical, and/or angular direction (e.g. move left, move right, move forward, move backward, move up, move down, or rotate left or right). The motion system 420 may control the motors 422 based on instructions from a computing device, such as the processor 406.

The motion system 420 may be configured to supply the power or current needed to drive the one or more motors 422 according to control signals generated by the motion system 420. The implementation of the motion system 420 may depend on the type of motors, which may be direct current (DC) motors such as brushed motors, brushless motors, servo motors, or alternating current (AC) motors. The DC motors, for example, may be driven by one or more transistors arranged to form an H-bridge circuit.

The one or more motors 422 may include a tilt motor and/or a pan motor. The tilt motor may be configured to control tilt angles of the event capture device 404 or portions thereof. Similarly, the pan motor may be configured to control a pan angle of the event capture device 404 or components thereof. Thus, the motors 422 may be used to move the event capture device 404 relative to the environment, thereby controlling which portions of the environment are detected or sensed by the event capture device 404. In one example, the event capture device 404 may be continuously or periodically panned or tilted for a selected period of time.

In some implementations, a motion may be applied or introduced to the event capture device 404 by a vibrating mechanism that is in contact with (or integrated with) the event capture device 404 to cause displacement or movement of the event capture device 404. For example, a haptic motion or force may be applied to the event capture device 404 to cause movement of the event capture device 404. The movement may induce an in-plane motion, an out-of-plane motion, a pitch, a yaw, or a roll to the event capture device 404 while the event capture device 404 is sensing variations or events of the scene. Further, synchronized or unsynchronized motion may be introduced to induce movement of the event capture device 404. Due to the movement of the event capture device 404, the event captured device 404 may obtain event data about objects in the field of view of the event capture device 404 that are static relative to the event capture device 404 or vehicle as further described below.

Further, the event capture device 404 may detect traffic lights and emergency lights. Although these lights may be power modulated with a short duty cycle, the transition of the lights from on to off can trigger the event capture device to generate signals of the sensed event.

The sensor system 400 or vehicle may additionally include inertial measurement units (IMUs) (not shown), including gyroscopes, accelerometers, and magnetometers, to assist with determining the position and orientation of the event capture device 404 or the components thereof. In some embodiments, the event capture device 404 may be disposed in close proximity to the image capture device 402. Further, the field of view of the event capture device 404 or the pose of the event capture device 404 may be adjusted so that the event capture device 404 acquires event data of at least a portion of the field of view of the image capture device 402. For example, the field of view of the event capture device 404 may overlap with the field of view of the image capture device 402.

Referring still to FIG. 4, the system memory 408 of the sensor system 400 may store information including sensor data (e.g., image data and event data) that may be retrieved, manipulated, and/or stored by the processor 406. The system memory 408 may be larger than the internal memory included in the processor 406 and may act as the main memory for the sensor system 400. In some examples, the system memory 408 may be located outside of or external to an integrated circuit (IC) containing the processor 406. The system memory 408 may comprise any type of volatile or non-volatile memory technology, such as dynamic random access memory (DRAM), synchronous dynamic random access memory (SDRAM), or Flash memory.

The system memory 408 may also be implemented as electrically erasable programmable read only memory (EEPROM) or another non-volatile or volatile memory type. In some examples, the system memory 408 may be a memory cache or buffer to temporarily store sensor data. In some implementations, the system memory 408 may be part of the image capture device 402 or the event capture device 404. Further, the system memory 408 may include program instructions that are executable by the processor 406 to facilitate the various functions described herein. For example, image compression and motion estimation algorithms may be stored in the system memory 408 and executed by the processor 406.

As shown in FIG. 4, the processor 406 of the sensor system may be communicatively coupled to the image capture device 402, the event capture device 404, and the system memory 408. The processor 406 may include any type of processor including, but not limited to, a microprocessor, a microcontroller, a digital signal processor (DSP), an image processor, or any combination thereof. The processor 406 may perform image processing functions on image data generated by the image capture device 402 and/or the event data generated by the event capture device 404. For example, the processor 406 may perform image enhancement (e.g., noise reduction), image stabilization (e.g., to compensate for movement of a camera), and object recognition (e.g., finding a specific object in event data or an image data), as well as other functions. In some implementations, the processor 406 may use feature extraction techniques to extract one or more gradient orientations from the event data and accumulate the gradients in histograms. Further, a Hough transform (IT) may be used to recognize any analytically describable shape from the event data (e.g., object detection) and classify the shape or object. In addition, the processor 406 may apply any of a number of data reduction techniques to the sensor data, such as redundancy avoidance, lossless compression, and lossy compression.

The processor 406 may be configured to receive image data from the image capture device 402 and event data from the event capture device 404. The event data may be received by the processor 406 in real-time directly from the event capture device 404. In other embodiments, the event data may be received in an offline manner and stored in the system memory 408 for later retrieval. The event data may include an address of the location of the pixel of the event capture device 404 that generates the event and event timing information (e.g., one or more timestamps), along with any other suitable data. For example, the event data may include information associated with a timing at which an event occurs and a location of the pixel of the event capture device 404 in which the corresponding event occurs. The processor 406 may use the event data received from the event capture device to track objects in the scene and/or control the operation of the vehicle.

The processor 406 may control the event capture device 404 and the image capture device 402, as well as other sensors, to detect objects (e.g., vehicles), to identify the objects, and to determine movement of the objects in the scene. The processor 406 may identify objects in a scene by analyzing the event received from the event capture device 404. Further, the processor 406 may use the event data to identify whether a particular object may be stationary or may be moving in a scene. For example, the processor 406 may determine that the object is substantially stationary or motionless in the scene 404 while the vehicle is stationary or in motion.

Further, the processor 406 may determine that objects in the field of view of the event capture device 404 are substantially stationary or static relative to the event capture device 404. For example, the processor 406 may identify objects in a scene and track the objects. The processor 406 may evaluate the event data received from the event capture device 404 and may determine that the objects may not be detected by the event capture device 404. For example, objects are substantially static or stationary relative to the event capture device 404 may not be sensed or detected by the event captured device. The processor 406 may determine that the pixels of the event capture device 404 associated with the objects are substantially static. Further, the processor 406 may determine that a substantial amount of event data associated with the object is no longer received by the processor 406. Thus, the processor 406 may determine that objects that are substantially static or stationary relative to the event capture device 404 may not be detected by the event capture device 404. In some examples, the event capture device 404 may not detect objects located directly in front of a vehicle when the vehicle is traveling in the pointing direction of the event capture device 404 because the object may be substantially stationary or static relative to the event capture device 404.

Once the processor 406 makes a determination that the event capture device 404 may not sense or detect an object (e.g., a stationary object) within the field of view of the event capture device, the processor 406 may cause movement of the event capture device 404. For example, when the processor 406 determines that an object has become stationary or static with respect to the event capture device 404 or the pixels associated with detecting the object are static, the processor 406 may send a command to the motion system 420 to cause the event capture device 404 to move. For example, the event capture device 404 may transition between a stationary state (e.g., a still state) and a non-stationary (e.g., a motion state). In some implementations, the processor 406 may send a command to the event capture device 404 to change or adjust the orientation, rotation, and/or oscillation of the event capture device 404 (e.g. move left, move right, move forward, move backward, move up, move down, rotate left or right, etc.). As such, the event capture device 404 may change from a stationary state to a non-stationary state.

In some examples, the processor 406 may cause the event capture device 404 to periodically transition between a stationary state and a non-stationary state (e.g., a moving state) while the vehicle is stationary or in motion Due to the movement of the event capture device, the event captured device 404 may generate event data associated with objects and backgrounds in the field of view of the event capture device that are stationary or static relative to the event capture device 404. For example, the event capture device 404 may generate event data from all sensing elements of the vision sensor. As a result, the event capture device 404 may detect such objects and backgrounds in the scene. For example, the event capture device may detect objects that are traveling substantially parallel to the vehicle at substantially the same speed. Further, the event capture device 404 may detect objects and/or backgrounds in a scene when the vehicle is substantially stationary. Additionally, the event capture device 404 may detect objects located near a center portion of the field of view of the event capture system that may be static or stationary relative to the event capture device as the vehicle is traveling in the pointing direction of the event capture device 404.

Figure 5:
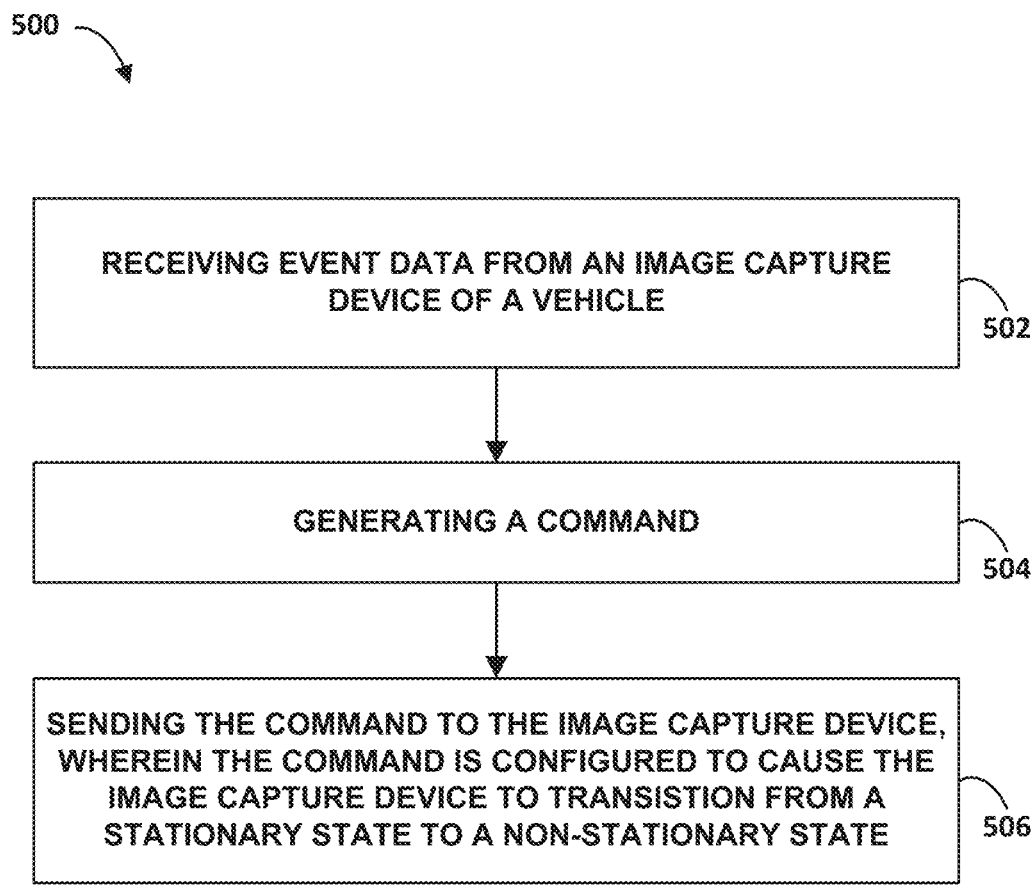
FIG. 5 is a flow chart of a method, according to an example implementation.

FIG. 5 is a flow chart of a method 500 for detecting events in a scene, according to an example implementation. Other example methods for detecting events in a scene may exist as well. The method 500 represents an example method that may include one or more operations as depicted by one or more blocks 502-506, each of which may be carried out by any of the systems shown in FIGS. 1-4, among other possible systems. In an example implementation, a computing system (e.g., a sensor system 104, a control system 106, remote computing system 302, server computing system 306, or sensor system 400) may perform the illustrated operations, although in other implementations, one or more other systems can perform some or all of the operations.

Those skilled in the art will understand that the flow chart described herein illustrates functionality and operations of certain implementations of the present disclosure. In this regard, each block of the flowchart may represent a module, a segment, or a portion of program code, which includes one or more instructions executable by one or more processors for implementing specific logical functions or steps in the processes. The program code may be stored on any type of computer readable medium, for example, such as a storage device including a disk or hard drive.

In addition, each block may represent circuitry that is wired to perform the specific logical functions in the processes. Alternative implementations are included within the scope of the example implementations of the present application in which functions may be executed out of order from that shown or discussed, including substantially concurrent or in reverse order, depending on the functionality involved, as would be understood by those reasonably skilled in the art. Within examples, any system may cause another system to perform one or more of the operations (or portions of the operations) described below.

At block 502, the method 500 includes receiving event data from an event capture device while the event capture device is in a stationary state. The event capture device 404 may be coupled to a vehicle. In some implementations, a computing device or system (e.g., the processor 406 of FIG. 4) may be configured to receive event data from an event capture device (e.g., the event capture device 404 of FIG. 4). The computing device may receive the event data in real-time and the event data may be stored in various types of memory or within a cloud. The computing device may use the event data to determine information about the surrounding environment, including objects in the vicinity of the vehicle, which may be used for operating autonomously. Further, the computing device may receive event data wirelessly or through a wired route. In other examples, other devices may receive the event data from an event capture device.

The computing device may be configured to analyze the event data from event capture devices to locate objects and backgrounds within the scene. Further, the computing device may use cameras that are positioned at different points on the vehicle to capture images of objects. In some implementations, the computing device may use additional sensors to obtain information about objects within the vicinity of the vehicle. In addition, the computing device may be configured to output commands to control a vehicle or may be configured to control a vehicle autonomously or some of the systems of the vehicle, such as the examples shown in FIGS. 1-4.

At block 504, the method 500 includes generating a command. In some implementations, the computing device may be configured to generate one or more commands to control one or more sensors. At block 506, the method includes sending a command to the event capture device. In some implementations, the computing device may output a command to the event capture device. The event capture device may include a motion system that may be activated by the computing device in order to control the movement of the event capture device or components thereof, such as a vision sensor. For example, a motor or actuator of the motion system may cause the event capture device to rotate or move in a horizontal, vertical, and/or angular direction. In some implementations, a motion or force may be applied to the event capture device for a period of time to cause movement of the event capture device. For example, a haptic motion may be introduced by a vibrating mechanism of the motion system that is in contact with (or integrated with) the event capture device to cause displacement or movement of the event capture device. Further, synchronized or unsynchronized motion may be introduced to induce movement of the event capture device.

In response to receiving a command from the computing device, the motion system may cause movement of the event capture device. For example, the motion system of the event capture device may cause the event capture device to change from a stationary state (e.g., a still state) to a non-stationary state (e.g., a motion state). In some examples, the event capture device may change from the stationary state to the non-stationary state after a period of time. Further, the computing device may cause the event capture device to periodically transition between the stationary state and the non-stationary state while the vehicle is stationary or in motion. As a result, the event capture device may be able to detect objects and backgrounds in the field of view of the event capture device that are substantially stationary or static relative to the event capture device or vehicle and generate event data about the objects and backgrounds as further described below.

The computing device may make a determination that objects and/or backgrounds in the scene may be substantially stationary or static relative to the event capture device. For example, objects located near a center portion of the field of view of the event capture system may be static or stationary relative to the event capture device when the vehicle is traveling in the pointing direction of the event capture device. In some implementations, the computing device may determine or detect objects in the field of view of the event capture device and track the movement of the objects in a scene. The computing device may evaluate the event data received from the event capture device about the objects and may determine that the objects may not be detected as a result of the objects becoming substantially stationary or static relative to the event capture device. For example, the computing device may determine that the event capture device may not sense an object that is substantially static or stationary relative to the event capture device. In some implementations, the computing device may determine that the event data associated with at least a portion of an object is no longer received from the event capture device. In other implementations, the computing device may determine that the sensing elements of the event capture associated with sensing an object are static or not generating event data. When the event capture device is unable to sense the object, the computing device may use other sensor devices to determine that the object is in the field of view of the event capture device.

Once the computing device makes a determination that the event capture device may not sense or detect objects or backgrounds within the field of view of the event capture device, the computing device may cause a motor or actuator to move the event capture device. As a result, the event capture device may transition between a stationary state (e.g., still) and a non-stationary state (e.g., a motion state). Due to the movement of the event capture device, the event captured device may generate event data associated with objects and background in the field of view of the event capture device that are stationary or static relative to the event capture device. As a result, the event capture device may generate event data associated with all of the sensing elements of the event capture device. As such, the computing device may receive event data associated with objects and backgrounds that are substantially stationary or static relative to the event capture device. Thus, the event capture device may detect objects and background that are stationary in the scene and that are substantially stationary or still relative to the event capture device. For example, the event capture device may detect objects located in the front of the vehicle when the vehicle travels in the pointing direction of the event capture device.

Figure 6:
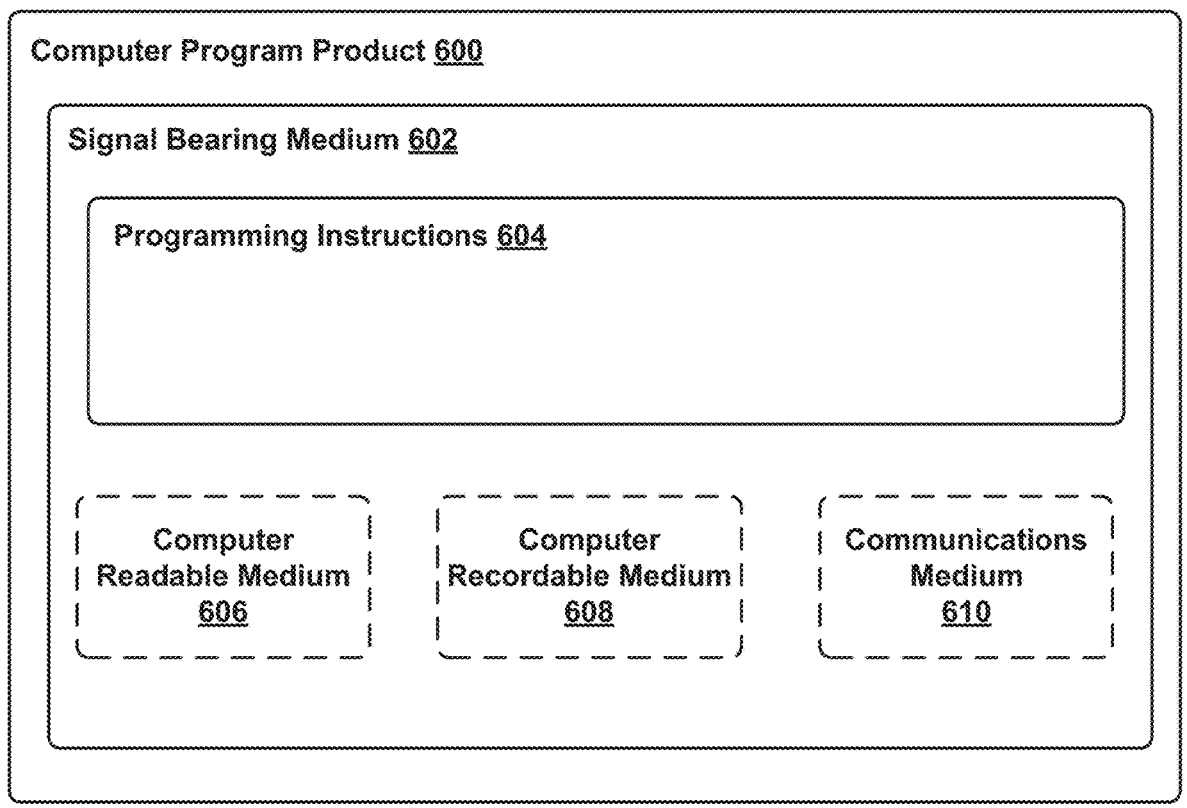
FIG. 6 is a schematic diagram of a computer program, according to an example implementation.

FIG. 6 is a schematic diagram of a computer program, according to an example implementation. In some implementations, the disclosed methods may be implemented as computer program instructions encoded on a non-transitory computer-readable storage media in a machine-readable format, or on other non-transitory media or articles of manufacture.

In an example implementation, computer program product 600 is provided using signal bearing medium 602, which may include one or more programming instructions 604 that, when executed by one or more processors may provide functionality or portions of the functionality described above with respect to FIGS. 1-4. In some examples, the signal bearing medium 602 may encompass a non-transitory computer-readable medium 606, such as, but not limited to, a hard disk drive, a CD, a DVD, a digital tape, memory, components to store remotely (e.g., on the cloud) etc. In some implementations, the signal bearing medium 602 may encompass a computer recordable medium 608, such as, but not limited to, memory, read/write (R/W) CDs, R/W DVDs, etc. In some implementations, the signal bearing medium 602 may encompass a communications medium 610, such as, but not limited to, a digital and/or an analog communication medium (e.g., a fiber optic cable, a waveguide, a wired communications link, a wireless communication link, etc.). Similarly, the signal bearing medium 602 may correspond to a remote storage (e.g., a cloud). A computing system may share information with the cloud, including sending or receiving information. For example, the computing system may receive additional information from the cloud to augment information obtained from sensors or another entity. Thus, for example, the signal bearing medium 602 may be conveyed by a wireless form of the communications medium 610.

The one or more programming instructions 604 may be, for example, computer executable and/or logic implemented instructions. In some examples, a computing device such as the computer system 112 of FIG. 1 or remote computing system 302 and perhaps server computing systems of FIG. 3 may be configured to provide various operations, functions, or actions in response to the programming instructions 604 conveyed to the computer system 112 by one or more of the computer readable medium 606, the computer recordable medium 608, and/or the communications medium 610.

The non-transitory computer readable medium could also be distributed among multiple data storage elements and/or cloud (e.g., remotely), which could be remotely located from each other. The computing device that executes some or all of the stored instructions could be a vehicle, such as vehicle 200 illustrated in FIG. 2. Alternatively, the computing device that executes some or all of the stored instructions could be another computing device, such as a server.

The above detailed description describes various features and operations of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

What is claimed is:

1. A method comprising:
receiving, by one or more processors, event data of a scene from sensing elements of an event capture device while the event capture device is in a stationary state, wherein each of the sensing elements of the event capture device generates event data in response to changes of light intensity, and wherein the event capture device is coupled to a vehicle;
generating, by the one or more processors, a command when the one or more processors no longer receive event data from one or more of the sensing elements of the event capture device for a period of time, wherein the one or more of the sensing elements of the event capture device no longer generate event data corresponding to a portion of the scene when the event capture device is in the stationary state and the one or more of the sensing elements maintain a substantially constant distance relative to the portion of the scene; and
sending, from the one or more processors, the command to an actuator to cause the event capture device to change from the stationary state to a non-stationary state, wherein the one or more of the sensing elements of the event capture device generates event data while the event capture device is in the non-stationary state, and wherein the actuator comprises a mechanism configured to cause displacement or movement of the event capture device.

2. The method of claim 1, wherein the event capture device includes a dynamic vision sensor.

3. The method of claim 1, wherein each of the sensing elements of the event capture device generates event data when the change in light intensity exceeds a threshold level.

4. The method of claim 1, further comprising:
detecting, by the event capture device, at least one event;
generating, by the event capture device, event data associated with the at least one event; and
asynchronously sending, by the event capture device, the event data to the one or more processors.

5. The method of claim 4, wherein the event data associated with the at least one event is generated in response to a change in an environmental condition, a change in an intensity of electromagnetic energy, or a change in an intensity of visible light.

6. The method of claim 1, wherein the event data includes location information and timing information associated with the scene.

7. The method of claim 6, wherein the location information includes a location of at least one sensing element in a sensor array of the event capture device, and wherein the timing information includes a time stamp.

8. The method of claim 1, further comprising determining a time stamp associated with the event data of the scene, and wherein the command is generated after the period of time.

9. The method of claim 1, further comprising receiving, by the one or more processors, the event data generated by the event capture device when the event capture device is in the non-stationary state.

10. The method of claim 1, further comprising:
generating, by the event capture device, event data when the event capture device is in the non-stationary state; and
detecting, by the one or more processors, a portion of at least one object in the scene based on the event data.

11. The method of claim 1, wherein the one or more of the sensing elements of the event capture device no longer generate event data corresponding to a portion of the scene, and wherein the portion of the scene is located near a center portion of a field of view of the event capture device.

12. The method of claim 1, wherein the one or more of the sensing elements of the event capture device no longer generate event data corresponding to a portion of the scene, and further comprising:
receiving, from an image capture device, image data; and
determining, based on the image data, that the portion of the scene is within a field of view of the image capture device.

13. An apparatus comprising:
a memory;
at least one processor configured to:
receive event data of a scene from sensing elements of an event capture device while the event capture device is in a stationary state, wherein each of the sensing elements of the event capture device generates event data in response to changes of light intensity, and wherein the event capture device is coupled to a vehicle;
generate a command when the one or more processors no longer receive event data from one or more of the sensing elements of the event capture device for a period of time, wherein the one or more of the sensing elements of the event capture device no longer generate event data corresponding to a portion of the scene when the event capture device is in the stationary state and the one or more of the sensing elements maintain a substantially constant distance relative to the portion of the scene; and
send the command to an actuator configured to cause the event capture device to change from the stationary state to a non-stationary state, wherein the one or more of the sensing elements of the event capture device generates event data while the event capture device is in the non-stationary state, and wherein the actuator comprises a mechanism configured to cause displacement or movement of the event capture device.

14. The apparatus of claim 13, wherein the event capture device comprises a dynamic vision sensor.

15. A non-transitory computer-readable medium storing instructions, the instructions being executable by one or more processors to perform operations comprising:
receiving event data of a scene from sensing elements of an event capture device while the event capture device is in a stationary state, wherein each of the sensing elements of the event capture device generates event data in response to changes of light intensity, and wherein the event capture device is coupled to a vehicle;
generating a command when the one or more processors no longer receive event data from one or more of the sensing elements of the event capture device for a period of time, wherein the one or more of the sensing elements of the event capture device no longer generate event data corresponding to a portion of the scene when the event capture device is in the stationary state and the one or more of the sensing elements maintain a substantially constant distance relative to the portion of the scene; and
sending the command to an actuator configured to cause the event capture device to change from the stationary state to a non-stationary state, wherein the one or more of the sensing elements of the event capture device generates event data while the event capture device is in the non-stationary state, and wherein the actuator comprises a mechanism configured to cause displacement or movement of the event capture device.

16. The method of claim 1, wherein the mechanism is configured to cause movement of the event capture device.

17. The method of claim 16, wherein the movement of the event capture device comprises at least one of an in-plane motion, an out-of-plane motion, a pitch, a yaw, or a roll.

18. The apparatus of claim 13, wherein the mechanism is a vibrating mechanism.

19. The apparatus of claim 18, wherein the vibrating mechanism is in contact with the event capture device.

20. The apparatus of claim 18, wherein the vibrating mechanism is integrated with the event capture device.

* * * * *